Dec. 5, 1939.   J. B. P. H. GALLE   2,182,554
BRAKE ADJUSTMENT INDICATING DEVICE
Filed Sept. 9, 1937
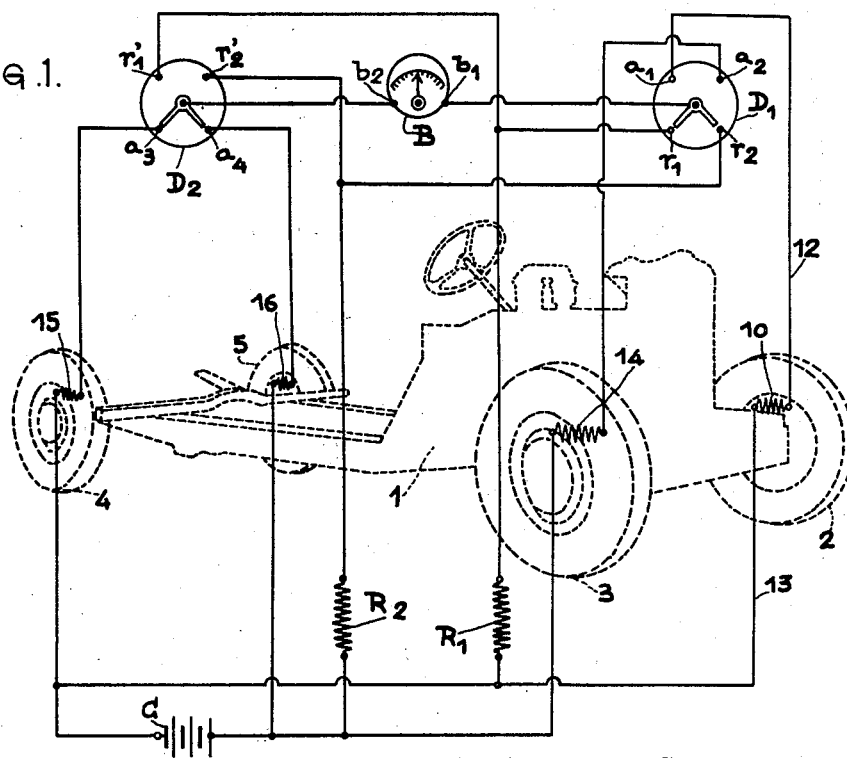
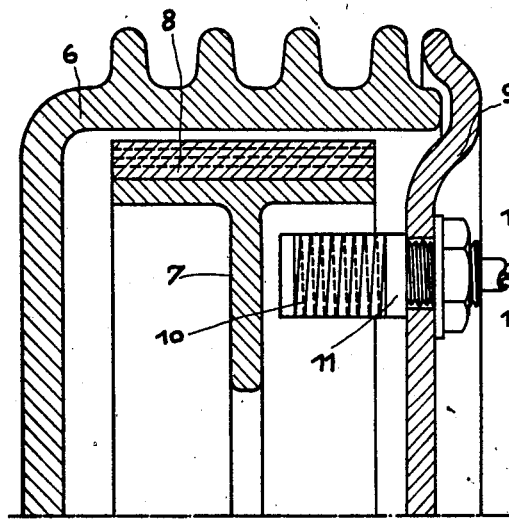
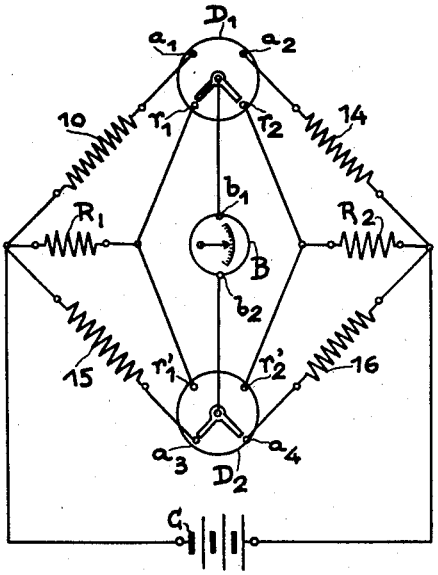
INVENTOR:
JEAN BAPTISTE PAUL HENRI GALLE
BY Haseltine Lake & Co.
ATTORNEYS Patented Dec. 5, 1939

2,182,554

UNITED STATES PATENT OFFICE 2,182,554

BRAKE ADJUSTMENT INDICATING DEVICE

Jean Baptiste Paul Henri Galle, Sceaux, France

Application September 9, 1937, Serial No. 163,100
In France October 8, 1936

2 Claims. (Cl. 73—342)

The suitable adjustment of brakes is of primordial importance for their operation and, consequently, for the safety of the vehicle provided with said brakes; which must be capable of being stopped within a very short space, without changing its direction.

On vehicles provided with several brakes acting simultaneously on different members, for instance, on several wheels in the case of a motor car, or of an airplane, it is essential that the braking action should be the same on each brake, or in constant relation with the braking action of the other brakes, otherwise the vehicle would be exposed to great danger in case of sudden stoppage.

The present invention has for an object a brake adjustment indicating device for verifying, on the vehicle itself, at every instant, in course of use, the satisfactory brake adjustment.

Braking is generally obtained by the action of a shoe rubbing against a rotating part of the vehicle. An evolution of heat results therefrom which is so much the greater as the movable object is moving at a higher speed and as the braking action is more powerful. The quantity of heat evolved is therefore a measurement of the braking power. It determines, as regards the rubbing surfaces, a rise of temperature which, in the usual conditions, is practically proportional to the heat evolved in this region.

It has already been proposed to measure, this rise of temperature, on the vehicle in motion, by means of sensitive thermometric members of small cumbersomeness, housed in or in proximity to the rubbing surfaces and acting from a distance on indicating members placed before the eyes of the driver. It has been also proposed to associate in series the thermometric members relative to the front wheels (or the rear wheels) in such a manner as the said thermometric members act in opposition upon a single indicating member; with such an arrangement the said indicating member does not receive any motion when the temperature raising remains the same in both front wheels (or rear wheels). But any temperature difference between both front wheels (or rear wheels) is indicated by the indicating member and the driver is then warned that the braking effect is not the same for both front wheels (or rear wheels).

The invention has for its object, in a vehicle provided with at least four wheels, to allow the verification of the braking effect by means of a single indicating member adapted to indicate the difference of braking effect which may occur either between the front wheels or the rear wheels, according to the position given to a switching or commutation device acted upon by the vehicle driver.

The accompanying drawing shows by way of example, and diagrammatically, an embodiment of the invention.

Fig. 1 diagrammatically illustrates the mounting of the device on a vehicle;

Fig. 2 is a partial section of a brake of said vehicle showing the assemblage of a thermometric resistance;

Fig. 3 is an electric diagram.

In this example the vehicle 1 comprises four wheels 2, 3, 4 and 5 and each of said wheels is individually provided with a brake. In Fig. 2 is partly shown a brake of the ordinary type, comprising a drum 6 which is secured on the wheel, and shoes 7 provided with a friction lining 8 which, upon braking, presses against the inner cylindrical surface of the drum 6. Finally, as is usual, the inner space of the drum is shielded from the introduction of dust or mud by the fixed flange 9.

According to the invention, a resistance responsive to temperature variations is associated with each brake, and arranged within the chamber, practically closed, formed by the drum 6 and the flange 9. In Fig. 2 is shown at 10 one of said resistances, for instance that associated with the wheel 2; said resistance is constituted by winding a suitable wire on a support 11, which in its turn is secured on the flange 9. At 12 and 13 are shown conductors for connecting the resistance 10 to the remainder of the circuit which will be described hereinafter. The three other resistances are shown at 14, 15 and 16. The resistance 14 is associated with the wheel 3, the resistance 15 with the wheel 4 and the resistance 16 with the wheel 5.

Each resistance is mounted in one of the branches of a Wheatstone bridge having the source of electric current C arranged in one of the diagonals of the bridge and a galvanometer B which is mounted in the other diagonal of the bridge. The galvanometer B therefore remains at zero as long as the resistances remain equal. If equilibrium no longer exists, warning is thus given that there are differences of heating up of the brakes. It is then necessary to determine which is the brake which is out of adjustment; it suffices for that purpose, to insulate the variable resistances two by two, for instance 10 and 14 and to substitute for these resistances, in the corresponding branches of the bridge, invariable resistances $R_1$, $R_2$. This operation will be effected for instance by means of a switch $D_1$ allowing of connecting at will to the terminal $b_1$ of the galvanometer, either the terminals $a_1$, $a_2$ of resistances 10, 14, or the terminals $r_1$, $r_2$ of resistances $R_1$, $R_2$. Likewise, the resistances $R_1$, $R_2$ can be substituted for resistances 15, 16 by means of a second switch $D_2$ allowing of connecting at will to the terminal $b_2$ of the galvanometer, either the terminals $a_3$, $a_4$ of resistances 15, 16, or the terminals $r'_1$, $r'_2$ of the comparison resistances.

In order to have the conditions of equilibrium of the Wheatstone bridge correspond to those of the respective brakes of the car, 10 designates for example the resistance corresponding to the left front brake, 14 the resistance corresponding to the right front brake, 15 the resistance corresponding to the right rear brake and 16 the resistance corresponding to the left rear brake.

If, for instance, 10 and 14 designate the resistances of the front wheels, 15 and 16 those of the rear wheels, after having balanced, on the one hand both front wheels and, on the other hand, both rear wheels by means of the preceding observations, it is possible, by the same method, to compare the braking action exerted on rear wheels 15 or 16 and that exerted on front wheels 10 or 14, by simply reversing, in the Wheatstone bridge, the battery and galvanometer diagonals.

The number of wheels and brakes considered, and the substitution of thermocouples for resistances or thermometric devices do not in any way change the principles of the invention, and the illustrations of some of these forms actually cover the rest by simple analogy.

What I claim as my invention and desire to secure by Letters Patent is:

1. In a vehicle having four wheels individually provided with brakes, the combination of an electric circuit forming a modified Wheatstone bridge comprising four resistances responsive to temperature variation, each of said resistances being respectively associated with a brake, a source of electric current arranged in one of the diagonals of said bridge, two fixed resistances each having one end connected to one of the ends of said diagonal, a galvanometer arranged in the second diagonal, and switch means respectively arranged at the ends of said second diagonal, in order for each to connect, on the one hand, the respectively corresponding end of said second diagonal in a first position to the resistances of the bridge adjacent to said end of the second diagonal, and on the other hand, in a second position to two free ends of the fixed resistances.

2. In a vehicle having four wheels individually provided with brakes the combination of an electric circuit forming a modified Wheatstone bridge comprising four resistances responsive to temperature variations, each of said resistances being respectively associated with a brake, and arranged in order that the resistance corresponding to the left front wheel is placed in a branch of the bridge opposite to the branch which contains the resistance corresponding to the left rear wheel and is adjacent to the branch which contains respectively the resistance corresponding to the right front wheel, a source of electric current arranged in the first diagonal of the bridge which connects both apices situated between resistances one of which corresponds to a front wheel and the other of which corresponds to a rear wheel, two fixed resistances each having one end connected to one of the ends of said first diagonal, a galvanometer arranged in the second diagonal, and switch means respectively arranged at the ends of said second diagonal in order for each to connect, on the one hand, the respectively corresponding end of said second diagonal in a first position to the resistances of the bridge adjacent to said end of the second diagonal, and on the other hand, in a second position to two free ends of the fixed resistances.

JEAN BAPTISTE PAUL HENRI GALLE.